US009914267B2

United States Patent
Beraud et al.

(10) Patent No.: US 9,914,267 B2
(45) Date of Patent: Mar. 13, 2018

(54) INTERMEDIATE MATERIALS PRODUCED BY MEANS OF INTERTWINNING BY INTERLACING VOILE YARNS

(75) Inventors: Jean-Marc Beraud, Rives (FR); Jean-Christophe Minni, Le Grand Bornand (FR)

(73) Assignee: Hexcel Reinforcements, Dagneux (FR)

( * ) Notice: Subject to any disclaimer, the term of this patent is extended or adjusted under 35 U.S.C. 154(b) by 692 days.

(21) Appl. No.: 13/513,914

(22) PCT Filed: Dec. 17, 2010

(86) PCT No.: PCT/FR2010/052779
§ 371 (c)(1),
(2), (4) Date: Jun. 5, 2012

(87) PCT Pub. No.: WO2011/086266
PCT Pub. Date: Jul. 21, 2011

(65) Prior Publication Data
US 2012/0237707 A1    Sep. 20, 2012

(30) Foreign Application Priority Data
Dec. 22, 2009 (FR) .................................... 09 59428

(51) Int. Cl.
*B29C 70/06* (2006.01)
*B32B 5/08* (2006.01)
(Continued)

(52) U.S. Cl.
CPC ............. *B29C 70/22* (2013.01); *B29B 11/16* (2013.01); *B29C 70/342* (2013.01);
(Continued)

(58) Field of Classification Search
CPC . B29C 70/22; B29C 53/824; Y10T 442/3041; Y10T 442/2008
(Continued)

(56) References Cited

U.S. PATENT DOCUMENTS 6,096,669 A    8/2000 Colegrove et al.
6,261,675 B1 *  7/2001 Hsiao et al. .................. 428/219
(Continued)

FOREIGN PATENT DOCUMENTS

EP    1046666 A1    10/2000
EP    1464743 A1    10/2004
(Continued)

*Primary Examiner* — Camie S Thompson
(74) *Attorney, Agent, or Firm* — W. Mark Bielawski; David J. Odenkamp (57) ABSTRACT

The present invention provides an intermediate material composed of an assembly of overlapping and interlaced tapes, characterized in that at least some of the tapes, preferably all of the tapes, known as veiled tapes, are composed of a series of reinforcing yarns or filaments that extend in a direction parallel to the length of the tape to form a unidirectional sheet that is associated on each of its faces with a nonwoven formed from thermoplastic fibers, said two nonwovens providing said veiled tape with cohesiveness because of their thermoplastic nature, to a production method using said material for producing composite parts, and to the composite parts obtained.

17 Claims, 7 Drawing Sheets

(51) Int. Cl.
  *B29C 70/22* (2006.01)
  *B29B 11/16* (2006.01)
  *B29C 70/34* (2006.01)
  *D03D 15/00* (2006.01)
(52) U.S. Cl.
  CPC ..... *D03D 15/0011* (2013.01); *D03D 15/0088* (2013.01); *D10B 2101/12* (2013.01); *D10B 2331/021* (2013.01); *D10B 2505/02* (2013.01); *Y10T 428/1369* (2015.01); *Y10T 442/2008* (2015.04); *Y10T 442/3041* (2015.04)
(58) Field of Classification Search
  USPC .................. 428/114, 196, 36.3; 442/186, 60
  See application file for complete search history.

(56) References Cited

U.S. PATENT DOCUMENTS

| | | | |
|---|---|---|---|
| 6,503,856 B1 * | 1/2003 | Broadway et al. | 442/366 |
| 6,995,099 B1 * | 2/2006 | Nishimura | B29C 70/083 |
| | | | 428/113 |
| 2002/0192467 A1 | 12/2002 | Secrist et al. | |
| 2004/0219855 A1 | 11/2004 | Tsotsis | |
| 2005/0115186 A1 * | 6/2005 | Jensen | A45F 3/04 |
| | | | 52/633 |
| 2006/0154545 A1 | 7/2006 | Tsotsis et al. | |
| 2006/0252334 A1 | 11/2006 | LoFaro et al. | |
| 2007/0066171 A1 | 3/2007 | Bystricky | |
| 2010/0269673 A1 * | 10/2010 | Levesque | 87/8 |
| 2011/0294387 A1 | 12/2011 | Simmons et al. | |
| 2012/0015135 A1 | 1/2012 | Beraud et al. | |
| 2012/0015167 A1 | 1/2012 | Beraud et al. | |
| 2012/0114899 A1 | 5/2012 | Ellis | |

FOREIGN PATENT DOCUMENTS

| | | |
|---|---|---|
| FR | 2580003 A1 | 10/1986 |
| FR | 2800100 A1 | 4/2001 |
| WO | 2005/047581 A1 | 5/2005 |

* cited by examiner

INTERMEDIATE MATERIALS PRODUCED BY MEANS OF INTERTWINNING BY INTERLACING VOILE YARNS

The present invention relates to the technical field of reinforcing materials adapted to making up composite parts. More precisely, the invention relates to a novel intermediate material for producing composite parts by subsequent injection or infusion of thermosetting resin, to a method of producing composite parts from such a material, and to the composite parts obtained.

Composite parts or articles, i.e. comprising both one or more pieces of reinforcement or fibrous sheets and also a matrix made principally of the thermosetting (resin) type and that may include thermoplastics, may, for example, be produced by using a "direct" or "LCM" (liquid composite molding) method. A direct method is defined by the fact that one or more pieces of fibrous reinforcement are used in the "dry" state (i.e. without the final matrix), the resin or matrix being employed separately, for example by injection into the mold containing the fibrous reinforcement ("RTM" method, resin transfer molding), by infusion through the thickness of the fibrous reinforcement (the "LRI" or liquid resin infusion method, or the "RFI" or resin film infusion method) or by manual coating/impregnation, using a roller or brush, onto each of the individual layers of fibrous reinforcement, applied in succession to the form.

For RTM, LRI, or RFI methods, in general a fibrous preform needs to be produced in the shape of the desired finished article, and then that preform is impregnated with a resin. The resin is injected or infused by pressure or temperature differentials, and then once all of the necessary quantity of resin is contained in the preform, the impregnated preform is heated to a higher temperature in order to carry out the cycle of polymerization/curing and thus cause it to harden.

The composite parts used in the automotive, aviation, or shipbuilding industries in particular are governed by very strict regulations, in particular in terms of mechanical properties. However, the mechanical properties of parts are principally linked to one parameter, namely the fiber volume fraction (FVF). Further, in those sectors, it is particularly important to have access to materials that are both extremely regular and also easy to handle and use.

In those sectors, a large number of preforms are produced from fabrics (in particular WO 94/12708) or braids, in particular of a cylindrical shape (EP 1 798 428 and US2007/0193439, for example). In order to improve the impact strength of parts that are to be produced from such preforms, the inventors have envisaged applying a chemical binder to such braids or fabrics in order to improve the mechanical performance of the parts obtained, in particular their impact strength.

However, applying such a chemical binder for improving the impact strength to a form such as a braiding mandrel is not an easy matter. Questions arise regarding the continuity of the binder and problems with automation. In addition, applying a chemical binder to a fabric or a braid might limit the deformability of the material obtained and thus its use on complex shapes.

In this context, the material of the invention has to offer design possibilities for the composite parts of primary or secondary structures with good mechanical properties as well as for parts with high fiber volume fractions.

That intermediate material must also be capable of being produced at a competitive cost and in a relatively easy manner. One of the aims of the invention is also to provide a material that can be produced in a manner that can readily be automated.

The material of the invention must be easy to manipulate and use. In particular, the present invention proposes a novel intermediate material that can be produced in complex shapes of the braid type with a cylindrical or complex shape. The material of the invention must also be capable of being produced in the form of a fabric or braid with a satisfactory deformability.

Thus, the present invention provides an intermediate material composed of an assembly of overlapping and interlaced tapes, characterized in that at least some of the tapes, preferably all of the tapes, known as veiled tapes, are composed of a series of reinforcing yarns or filaments that extend in a direction parallel to the length of the tape to form a unidirectional sheet that is associated on each of its faces with a nonwoven formed from thermoplastic fibers, said two nonwovens providing said veiled tape with cohesiveness because of their thermoplastic nature.

Other characteristics of the material of the invention are detailed in the claims.

The material of the invention is intended for producing composite parts using a direct method. In addition, the weight of the nonwovens in each veiled tape represents 3% to 10% of the total weight of each tape.

The invention also provides a method of producing a composite part, characterized in that it comprises the following steps:

a) providing at least one material of the invention;

b) optionally, stacking various materials of the invention and optionally securing them into the form of a preform;

c) adding a thermosetting resin by infusion or injection;

d) consolidating the desired part by means of a polymerization/curing step following a pre-set temperature and pressure cycle, followed by cooling.

In accordance with a particular implementation of the method of the invention, the thermosetting resin is added by infusion at a pressure below atmospheric pressure, in particular at a pressure below 1 bar, for example in the range 0.1 bar to 1 bar.

In another aspect, the invention provides composite parts that can be obtained using said method, which in particular have a fiber volume fraction (FVF) of 50% to 63%, preferably 53% to 60%.

Various other characteristics become apparent from the following description made with reference to the accompanying drawings, in which.

The invention proposes materials produced by overlapping and interlaced tapes, at least some of which are veiled tapes. In the context of the invention, the unidirectional yarns or filaments making up the tapes are associated with nonwovens before they are overlapped and interlaced. In addition, in the material of the invention, each veiled tape is associated with two nonwovens over its entire length, including the intersecting and/or interlacing points. The overlapping and interlacing is, for example, accomplished by weaving or braiding. Compared with a fabric that would be associated with a chemical binder after weaving, for example in the form of a veil, the advantage of a material of the invention produced from strips of unidirectional fibers associated with a nonwoven formed from thermoplastic fibers at each of their faces is primarily as regards deformability, which will be much better in the context of the invention, since the strips can move relative to each other, while yarns are locked by the chemical binder for a fabric treated after weaving or a braid treated after braiding. In a material of the invention, the tapes can move relative to one another, since apart from the mechanical connection obtained by overlapping/interlacing, there are no other connections, in particular no connections obtained by means of a chemical binder between the tapes by bonding or otherwise.

Furthermore, the fact that tapes carrying nonwovens are used directly and provide the final part with the desired mechanical properties opens up many design possibilities. As an example, the material of the invention may be braided directly onto a mandrel to obtain a cylindrical braid and then be shaped, for example by stitching or preforming, to produce a more complex preform as illustrated in particular in FIG. 7. The material of the invention may also be braided directly onto a mandrel with a complex shape, possibly in several successive layers.

In addition, the specific choice of veiled tapes over other tapes associated with another type of chemical binder such as a thermoplastic powder or a hot melt powdered binder such as that provided by Oxeon means that composite parts can be obtained that have better impact strength properties.

Figure 1:
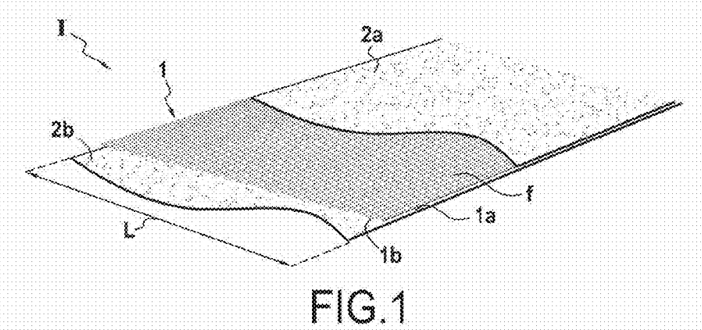
FIGS. 1 and 2 are respectively a diagrammatic perspective, partially cutaway and cross-sectional representation of a tape used in the context of the invention, in which a unidirectional sheet is associated with two nonwovens.
Figure 2:
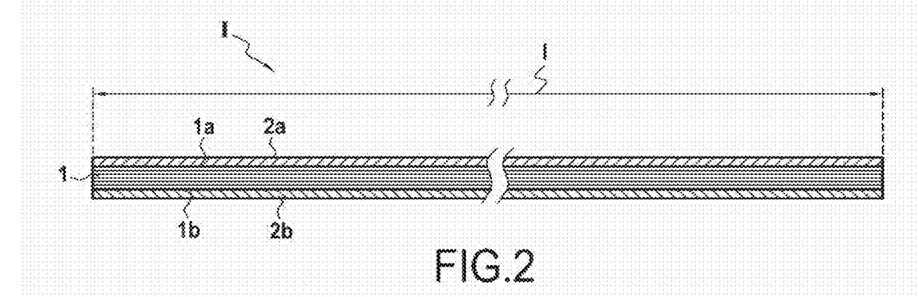

In the context of the invention, the term "tape" or "strip" means a sheet material that has a length that is much greater than its width. Such tapes may in particular have widths of 3 mm [millimeter] to 25 mm. Veiled tapes may be produced from one or more yarns, a yarn being made up of a series of filaments. Narrower veiled tapes may even be obtained if a very fine 1K or 3K yarn is used. In the remainder of the text, a strip of parallel yarns or filaments may also be termed a strip of parallel fibers. As can be seen in FIG. 1, the veiled tapes I produced in the context of the invention have a length "l" and a width "L". These veiled tapes are made up of an assembly of filaments "f" (for a single yarn 1) or of an assembly of yarns 1 (each made up of an assembly of filaments) that extend parallel to the width of the tape. A veiled tape is generally rectangular in shape and is associated on each of its major faces 1a and 1b with a nonwoven (respectively 2a and 2b), as can be seen in FIG. 2.

The term "nonwoven", also known as a "veil", conventionally means an assembly of continuous or short fibers disposed in a random manner. Such nonwovens or veils may, for example, be produced using "Meltblow", "Spunlaid", or "Electrospinning" methods that are familiar to the skilled person. In particular, the constituent fibers of a nonwoven may have mean diameters in the range 0.5 µm [micrometer] to 70 µm. For a nonwoven of short fibers, the fibers may, for example, have a length in the range 1 mm to 100 mm. Using nonwovens with a random, isotropic coverage means that each veiled tape has a uniform cohesiveness in all directions, in contrast to the use of spaced apart yarns, for example. For each veiled tape, the bond between the nonwovens and the unidirectional sheet has been provided in advance by heating to exploit the hot tack nature of thermoplastic nonwovens followed by cooling. By way of example, the constituent fibers of the nonwovens are advantageously made up of a thermoplastic material, in particular selected from: polyamides (PA: PA6, PA12, PA11, PA6,6, PA 6,10, PA 6,12, etc.), copolyamides (CoPA), polyamides—block ether or ester (PEBAX, PEBA), polyphthalamide (PPA), polyesters (polyethylene terephthalate —PET—, polybutylene terephthalate—PBT—etc.), copolyesters (CoPE), thermoplastic polyurethanes (TPU), polyacetals (POM, etc.), polyolefins (PP, HDPE, LDPE, LLDPE etc.), polyethersulfones (PES), polysulfones (PSU etc.), polyphenylene sulfones (PPSU etc.), polyetheretherketones (PEEK), polyetherketoneketone (PEKK), poly(phenylene sulfide) (PPS), or polyetherimides (PEI), thermoplastic polyimides, liquid crystal polymers (LCP), phenoxys, block copolymers such as styrene-butadiene-methylmethacrylate copolymers (SBM), methylmethacrylate-butyl acrylate-methylmethacrylate copolymers (MAM), and mixtures thereof. The nonwovens may be made up of fibers of the same nature and also of a mixture of fibers made up of these thermoplastic materials. The material is clearly adapted to the various types of thermosetting systems used to make up the matrix during subsequent production of the composite parts.

Each veiled tape used to make up the intermediate material of the invention has a nonwoven of thermoplastic fibers on each of its large faces that provides it with cohesiveness. Particular examples of thermoplastic fiber nonwovens that may be used are nonwovens supplied, for example, by Protechnic (66, rue des Fabriques, 68702—CERNAY Cedex—France) or Spunfab Ltd./Keuchel Associates, Inc. (175 Muffin Lane Cuyahoga Falls, Ohio 44223, USA).

In the context of the invention, the unidirectional sheet made up of one or more reinforcing yarns may be formed from a material selected from the following materials: carbon, glass, aramid, silica, basalt, ceramic, and mixtures thereof, or any other material used in the field of composite materials, the fibers possibly being natural or synthetic. However, carbon fibers are preferred.

Within each tape, the filaments or reinforcing fibers are disposed so as to provide quasi-complete coverage over the whole tape surface. In particular, when the veiled tape is made up of a unidirectional sheet of a plurality of yarns, they are disposed edge to edge with a minimum or indeed no gaps or overlaps.

A yarn is generally made up of an assembly of filaments and generally comprises, with carbon yarns, 1000 to 80000 filaments, advantageously 12000 to 24000 filaments. Particularly preferably in the context of the invention, 1K [count] to 24K carbon yarns, for example 3K, 6K, 12K, or 24K, preferably 12K and 24K, are used. The constituent fibers are preferably continuous. The yarns present within the veiled tapes have a cross section that is substantially rectangular or elliptical and are known as flat yarns. Such yarns have a certain width and thickness. By way of example, a 3K flat carbon yarn with a weight of 200 Tex generally has a width of 1 mm to 3 mm, a 12K flat carbon yarn with a weight of 446 Tex has a width of 2 mm to 5 mm, a 12K flat yarn with a weight of 800 Tex has a width in the range 3 mm to 7 mm, a 24K flat carbon yarn with a weight of 1600 Tex has a width of 5 mm to 12 mm and a 24K flat carbon yarn with a weight of 1040 Tex has a width of 5 mm to 10 mm. A flat carbon yarn of 3000 to 24000 filaments will thus usually be 1 mm to 12 mm wide. For certain embodiments, the carbon yarns present in the veiled tapes have a weight in the range 60 Tex to 3800 Tex and preferably in the range 400 Tex to 900 Tex. Before associating the yarn or yarns with the nonwoven to produce the tapes, yarns in routine use in the industry may optionally be spread. By way of example, the thickness of the unidirectional carbon sheet within a tape may be approximately 90 μm to 270 μm. Carbon yarns can be classified as either high strength (HS) yarns with a tensile modulus in the range 220 GPa [gigapascal] to 241 GPa and with a tensile breaking stress in the range 3450 MPa [megapascal] to 4830 MPa, intermediate modulus (IM) yarns with a tensile modulus in the range 290 GPa to 297 GPa and with a tensile breaking stress in the range 3450 MPa to 6200 MPa, and high modulus (HM) yarns with a tensile modulus in the range 345 GPa to 448 GPa and with a tensile breaking stress in the range 3450 MPa to 5520 MPa (see the "ASM Handbook", ISBN 0-87170-703-9, ASM International 2001).

The veiled tapes as described above, more precise examples of which are provided in the remainder of the description and examples are used in the context of the invention to produce intermediate materials intended to be associated with a matrix of thermosetting resin for the subsequent production of composite parts, in particular in aviation. In the intermediate materials of the invention, these veiled tapes are superimposed, overlapped and interlaced. The intermediate materials of the invention are preferably exclusively made up of veiled tapes composed of a series of reinforcing yarns or filaments that extend in a direction parallel to the length of the tape to form a unidirectional sheet that is associated with a nonwoven formed from thermoplastic fibers on each of its faces, these two nonwovens providing said veiled tape with cohesiveness due to their thermoplastic nature. In particular, the intermediate materials of the invention are exclusively made up of a braid or weave of veiled tapes as described in more detail in the present patent application. However, it is not excluded for the veiled tapes in the intermediate materials of the invention to be combined with other tapes such as single yarns or others. Said veiled tapes may, for example, only be used in the weft in a woven fabric, the warp yarns being conventional and not veiled, or on one yarn in two in a braid, such that the whole surface of the textile architecture is covered with at least one veiled tape.

Any type of overlapping and interlacing technique may be used. Preferably, the coverage provided by the overlapping is a maximum. Advantageously, the material of the invention will have an opening factor of 0.5% or less. This opening factor may in particular be determined using the method described in the examples. Such an opening factor may be obtained more easily when the veiled tapes used are calibrated and/or when the material of the invention is made up exclusively of veiled tapes.

Figure 3:
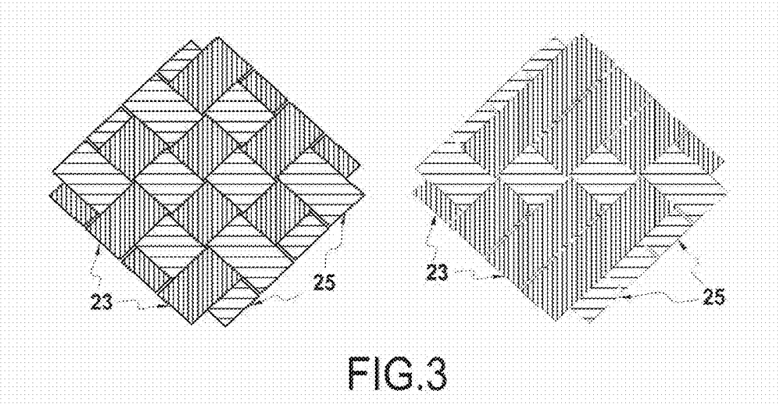
FIG. 3 shows different weave constructions that an intermediate material of the invention may have.

As an example, it may be possible to use any weaving technique, in particular those described in documents WO 2006/0759961 and WO 98/46817. In the materials of the invention, the tapes may be woven, using various constructions, in particular of the taffeta weave (also known as a plain weave), twill or satin type as illustrated in FIG. 3 (left hand portion: taffeta and right hand portion: satin) or FIG. 9. The reference numerals 10 and 11 respectively designate the tapes of the weft and the tapes of the warp. It is also possible to use the technique described in patent application EP 0 670 921, which describes an improved weaving method in which the weft is unwound without twisting and in which a vibrational spreading system may also be applied to the fabric obtained to improve its fiber volume fraction by reducing its opening factor. In the context of the invention, the material of the invention may be obtained in a weaving method that may use one or the other of those improvements or both in combination. Untwisting the weft on deploying it as described in that document has the advantage of not adding twist to the tape, which can thus stay flat in the woven intermediate material that is obtained.

Figure 4:
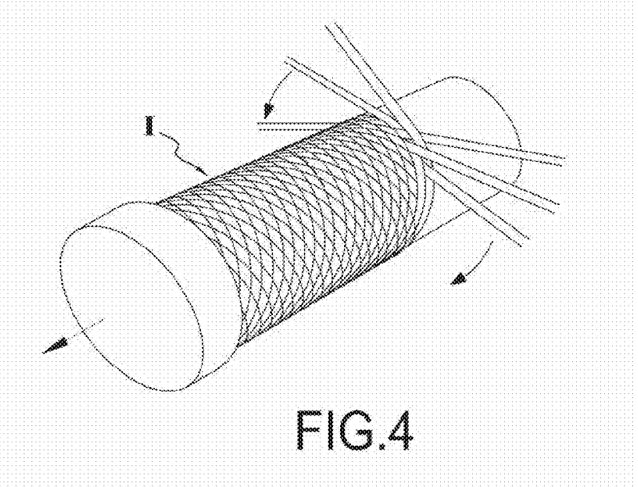
FIG. 4 represents a material of the invention with a cylindrical braided shape.

The material of the invention may also be in the form of a braid, in particular a braid forming a cylinder as can be seen in FIG. 4. Such braids are produced by braiding tapes as described above. Braiding techniques such as those described in documents EP 1 798 428 or US 2007/0193439 may in particular be used. In those techniques, robotic means place a mandrel in the center of a braider and sweep the length of the mandrel during braiding so that the braid covers the mandrel. After several passes, the mandrel is covered with various layers of braided tapes. It is easy to employ the tapes used in the context of the invention on braiders, especially when they are optimized to braid flat yarns. A non-symmetrical braiding system using two types of tapes such as that described in application WO 92/15740 may also be used. It is also possible to stitch an open braid to provide it with a cylindrical shape or any other desired complex shape.

There follows a description of a particular type of veiled tape of carbon fibers that can be used to obtain intermediate materials of the invention that in particular can be used for the subsequent production of composite parts that combine both good mechanical properties and a high fiber volume fraction, these being desirable properties in the aviation field in particular. In accordance with a preferred embodiment, each veiled tape making up the intermediate material of the invention is made up of a unidirectional sheet of carbon fibers with a weight per unit area of 100 $g/m^2$ [gram per square meter] to 280 $g/m^2$ associated on each of its faces with a nonwoven formed from thermoplastic fibers, said nonwovens each having a thickness of 0.5 micrometers to 50 micrometers, preferably 3 micrometers to 35 micrometers. In a particular embodiment, each veiled tape has a thickness of 80 micrometers to 380 micrometers, preferably 90 micrometers to 320 micrometers, preferentially 93 micrometers to 305 micrometers.

French standard NF EN ISO 9073-2 cannot be used to measure one of the constituents of a material combined with several elements. The following methods can be used: one to measure the thickness of a nonwoven in a tape and the other to measure the total thickness of the tape.

Thus, in a tape, the thickness of the nonwoven or veil attached to the unidirectional sheet of reinforcing yarns or filaments may be determined from microscopic sections that allow accuracy of ±1 μm. The method is as follows: a veiled tape combining a unidirectional sheet made up of reinforcing yarns or filaments and two veils bonded on each side of the sheet is impregnated using a brush with a resin that polymerizes at ambient temperature (Araldite and Araldur 5052 from Huntsman). The assembly is fixed between two plates in order to apply a pressure of the order of 2-5 kPa [kilopascal] during polymerization. The measurement of the thickness of the veil present in the veiled tape is independent of the pressure exerted during this step. A section of the assembly is coated with a cold setting resin, Epofix Kit from Struers, then polished (using an abrasive silicon carbide-based paper with a grain size of 320 μm and various pads up to a grain of 0.3 μm) so that it can be observed using an Olympus BX 60 optical microscope coupled to an Olympus ColorView IIIu camera. This resin, which polymerizes at ambient temperature, does not influence the thickness of the veil, but is used only to enable the measurements to be made. AnalySIS auto 5.0 software from Olympus Soft Imaging Solution GmbH can be used to take the photographs and to carry out the thickness measurements. For each veiled tape (unidirectional sheet combined with veils on each side), 5 images are taken at a magnification of 20. On each image, 15 measurements of the thickness of the veil are made and the mean and standard deviation of these measurements are determined.

Figure 5A:
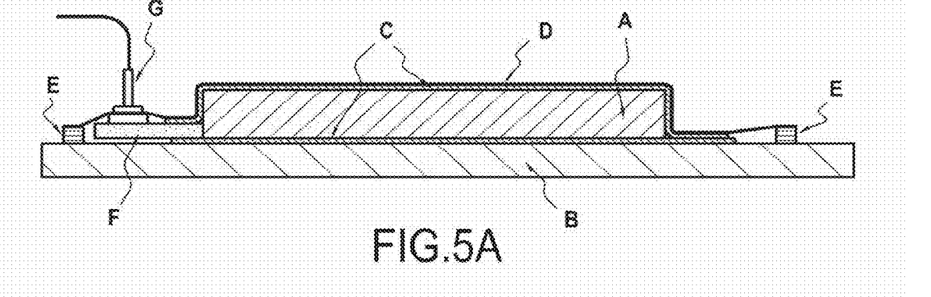
FIGS. 5A and 5B represent a device for measuring the thickness of a preform formed by tapes, under vacuum.
Figure 5B:
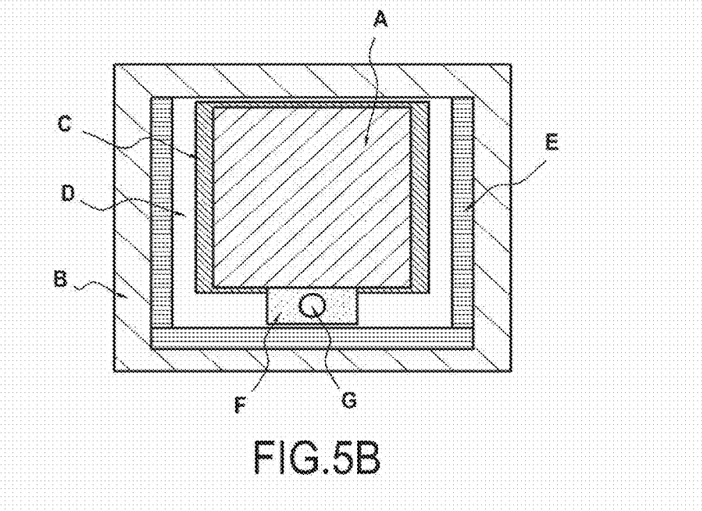

The total thickness of a veiled tape may be determined by using the following method, the device for which is shown diagrammatically in FIGS. 5A and 5B, which determines a mean for a preform made up of a stack of veiled tapes. On these figures, A designates the preform; B the support plate; C the silicone paper; D the vacuum film; E the vacuum seal; F the breather fabric; and G the vacuum plug. This method is in routine use by the skilled person and can be used to provide an overall measurement, minimizing the variability that may exist locally within a single tape. A preform made up of a stack of different orientated layers of veiled tape is placed between two layers of 130 g/m² silicone paper with a thickness of 0.15 mm supplied by SOPAL in a CAPRAN 518 vacuum film from Aerovac (Aerovac Systèmes, France, Umeco Composites, 1 rue de la Sausse, 31240 Saint-Jean, France) and in contact with an Airbleed 10HA breather fabric supplied by Aerovac. The assembly is sealed by a SM5130 vacuum seal supplied by Aerovac. A vacuum in the range 0.1 kPa to 0.2 kPa is drawn using a Leybold SV40 B vacuum pump (Leybold Vacuum, Bourg les Valence, France). Next, the thickness of the preform is measured between two TESA Digico 10 digital indicators after subtracting the thickness of the vacuum bag and the silicone papers. 25 measurements are made per preform and the mean and standard deviation of these measurements are determined. The thickness obtained for the veiled tape is then determined by dividing the total thickness of the preform by the number of layers of superimposed veiled tapes.

Advantageously, the thickness of each veiled tape present in the intermediate product of the invention has a low variability, especially with variations in thickness not exceeding a standard deviation of 20 μm, preferably not exceeding a standard deviation of 10 μm. This characteristic can be used to improve the regularity of the composite parts that may be obtained.

The weight per unit area of the sheet of carbon fibers may be determined from the weight per unit area of each veiled tape (unidirectional sheet+2 veils). If the weight per unit area of the veils is known, it is then possible to deduce the weight per unit area of the unidirectional sheet. Advantageously, the weight per unit area is determined from the intermediate product by chemical attach (possibly also by pyrolysis) of the veil. This type of method is conventionally used by the skilled person to determine the carbon fiber content of a fabric or a composite structure.

There follows a description of a method of measuring the weight per unit area of a tape. The weight per unit area of a tape is measured by weighing 100 cm² cut samples (i.e. 113 mm diameter). In order to facilitate cutting of the samples from a tape that is flexible, the tape is placed between two 447 g/m², 0.450 mm thick glossy cards from Cartonnage Roset (Saint Julien en Genevois, France) to provide the assembly with some rigidity. A pneumatic circular punch from Novi Profiber (Eybens, France) is used to cut the assembly; 10 samples are taken per type of tape.

Further, advantageously, the weight per unit area of the veil present in each veiled tape is in the range from 0.2 g/m² to 20 g/m².

In each tape, the association between the unidirectional sheet and the veils may be made discontinuously, for example only at certain points or zones, but is preferably carried out by means of a connection that extends over the whole surface of the sheet, which is termed continuous. The association of the unidirectional sheet with the two veils may be carried out using an adhesive layer, for example selected from epoxy adhesives, polyurethane adhesives, thermosetting glues, adhesives based on polymerizable monomers, structural acrylic adhesives or modified acrylic adhesives, and hot-melt adhesives. However, the association is usually accomplished because of the tacky nature of veils when hot, for example during a thermo-compression step when being formed that can be used to provide a connection between the unidirectional sheet and the veils. Preferably, the cohesion of each veiled tape is provided exclusively by the thermoplastic nonwovens.

In a particular embodiment, each veiled tape has a substantially constant given width over its entire length, i.e. the veiled tapes have very low variability in width over their entire length. Under such circumstances, because the width of the veiled tapes used is substantially constant, the veiled tapes of the invention also have very low variability in terms of weight per unit area. In particular, the width of each veiled tape has a standard deviation that is less than 0.25 mm, preferably less than 0.22 mm and preferentially 0.20 mm or less over the entire length of said tape. A small variability in width also means that highly regular parts can be produced subsequently, with controlled mechanical properties. The width of the veiled tapes and the standard deviation may be determined using the method described in the examples for the results of Table 3. The standard deviation may be defined as the root mean square of deviations from the mean, i.e.:

$$\sqrt{\frac{1}{n}\sum_i (x_i - \bar{x})^2} \quad (1)$$

where:
n=number of values;
$x_i$=a value
$\bar{x}$=arithmetic mean.

Such a veiled tape with a substantially constant width may be obtained using a method that comprises the following steps:
A1) adjusting the width of the tape to the desired width using calibration means;
A2) associating each of the faces of the tape with a nonwoven of thermoplastic fibers to ensure homogeneous cohesion of the tape, such that the total weight of the nonwovens does not exceed 25% of the total weight of the tape obtained.

The veiled tape may be made up of one or more yarns. When a tape is made up of several yarns, it is the totality of the yarns (and not each yarn taken individually) that is calibrated to produce a sheet of given width.

The method of making up said veiled tapes, which are not currently commercially available, is described in detail below. The yarn or yarns may be drawn from a spool and they may be spread, before the calibration step. To this end, the yarn or yarns may pass over a spreader device, for example made up of one or more spreader rods. This spreading step may be necessary, depending on the desired weight per unit area and also to obtain, before calibration, a width for the sheet or for the yarns that is greater than the width desired after calibration. This calibration system could be completed by a rod vibrating in the direction of its length, located at the outlet from the spreader rod just upstream of the calibration means. Similarly, such a device could be completed by several vibrating rods when an association of large weight yarns is used for very low weight per unit areas.

The calibration step is carried out by passing the sheet or yarn over calibration means; this may be a passage of a given width, especially in the form of a groove with a flat bottom, provided on a roller or a passage provided between two teeth, when a single tape based on one or more yarns is produced, or a calibrating comb defining calibrated passages for a plurality of yarns, when several veiled tapes are produced at the same time. When a sheet made up of a plurality of yarns is produced, calibration proper of the width of the sheet is only carried out on the two outermost yarns, the other yarns being guided by a comb located upstream of the spreading element, such that there is no free space between the yarns inside the sheet.

At the outlet from the calibration means, the calibrated unidirectional sheet will have a quasi-constant width over its entire length that it will retain until the final veiled tape is obtained. Preferably, at the outlet from the calibration means, the width of the calibrated unidirectional sheet will have a standard deviation substantially below 0.25 mm, preferably less than 0.24 mm and preferably 0.20 mm or less over the entire length of the unidirectional sheet.

In such a method, the nonwovens are advantageously associated with the tape after adjusting the width of the tape so as to maintain the width obtained after adjustment. It is thus possible to calibrate the tape to the desired width, which is substantially constant over its entire length, and to fix the calibration obtained by associating the fiber tape with the nonwovens by bonding and to thereby minimize variations in width. Each face of the calibrated unidirectional sheet obtained is then associated with a thermoplastic nonwoven, for example on a conveyor belt driven by rollers. The distance between the outlet from the calibration means and the means for associating the sheet with the nonwoven is preferably very short, of the order of a few millimeters, in order to retain the calibration obtained. In order to allow them to be bonded with the yarns or filaments, after cooling, upstream of their being associated with the tape, the nonwovens undergo a heating step that softens or even melts the polymer. The heating and pressure conditions are adapted to the constituent material of the nonwovens and to their thickness. Usually, the thermocompression step is carried out at a temperature in the range from $T_{MPt\ nonwoven}-15°$ C. and $T_{MPt\ nonwoven}+60°$ C. (where $T_{MPt\ nonwoven}$ designates the melting point of the nonwoven) and at a pressure of 0.1 MPa to 0.6 MPa. Thus, it is possible to reach degrees of compression of the nonwoven before and after association of 1 to 10. The step of laminating the nonwovens to the unidirectional reinforcing fibers is also a determining step in properly controlling the final thickness of the tape. In fact, the temperature and pressure conditions, especially during laminating, can be used to modify and thus adjust the thickness of the nonwoven present on each side in the tape.

The thickness of the nonwovens before they are associated with the unidirectional sheet is selected as a function of the manner in which they are to be associated with the sheet of unidirectional fibers. Usually, their thickness is very close to the desired thickness on the tape. It may also be possible to choose to use a nonwoven with a greater thickness that is then heat laminated during the association step in order to produce the desired thickness. Preferably, each of the major surfaces of the sheet of unidirectional fibers is associated with two substantially identical nonwovens in order to obtain a perfectly symmetrical intermediate product.

In accordance with a particular embodiment that may be combined with the preceding embodiments, each veiled tape has no cut fibers on its longitudinal edges. This makes them much easier to use in the braiding and weaving methods. In fact, the presence of cut fibers or filaments at the edge of the tape has the disadvantage of creating zones in which the fibers or filaments accumulate at certain points along the path of the tape in the above-mentioned methods and of causing machine stoppages due to the yarns breaking or the poor quality of the reinforced material that is produced. These edges with the presence of cut filaments also generate yarns that roll up on themselves as the spool on which the tape is wound unwinds, which also leads to yarn breakages or quality defects (these are known as "rings" formed on the tape spool). Such a characteristic is rendered possible primarily due to the method described above that avoids cutting to obtain the desired width of the tape.

In addition, in accordance with a particular embodiment that may be combined with the preceding embodiments, at certain points only of its longitudinal edges or over the entire length of its two longitudinal edges, each veiled tape has a direct connection between the two nonwovens, formed because of the thermoplastic nature thereof.

In the context of this variant embodiment, in order to further promote the production of a clean edge and to better control the width of the tape, in the method described above, both the tape and also the cut portions either side of its edges are entrained by extraction means such as entrainment or suction means.

Figure 6:
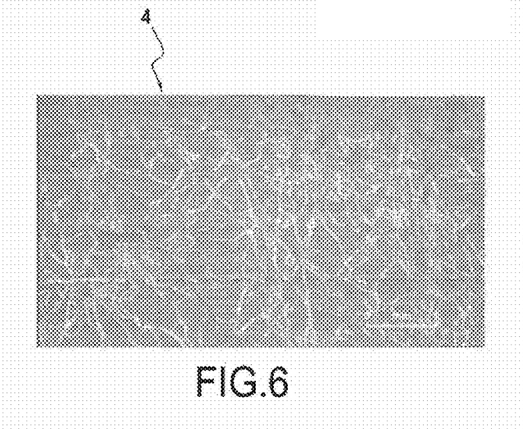
FIG. 6 is a photograph of an example of a tape that may be used in the context of the invention and shows its very clean edge.

Under such circumstances, the width of the nonwovens is selected so that they go beyond the unidirectional sheet on either side. Next, the tape is pulled from the conveyor belt using an entrainment roller (draw roller) and then is cut at each of its longitudinal edges using a heated cutting device, in particular heated knives. The cut is not carried out in a yarn but just to one side of a yarn in order to prevent any fraying. Hot cutting of the nonwoven at each edge of the tape causes it to shrink to a certain extent. The width of the two nonwovens is greater than the width of the unidirectional sheet and so the two nonwovens spot bond to each other, preferably to trap the unidirectional sheet at the carbon edges. The veiled tape obtained then has a very clean edge 4 without fragments of cut filaments, as illustrated in FIG. 6.

The tape is then drawn using draw rollers. It is also possible to further promote the production of a very clean edge by extracting nonwoven scrap using entrainment roller type entrainment means or using suction means. The extreme portions corresponding to the waste then comprise a yarn with a nonwoven that may be cut on only one side, thereby enhancing entrainment or suction of waste. The edges intended to be cut and act as waste may also be provided with a yarn of a different nature to those used to make up the veiled tapes.

Figure 7:
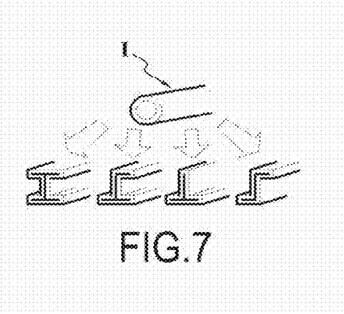
FIG. 7 shows various shapes of parts that may be obtained starting from an intermediate material of the invention in the form of a cylindrical braid.

The intermediate materials of the invention may be used to produce aeronautical parts that demand high mechanical performance, in particular for producing primary structure parts. In particular, cylindrically shaped braids of the invention may be used to manufacture longilinear parts such as the frames of fuselages or stiffeners. Under such circumstances, for example, the braid is deformed and held in shape by stitching or preforming (thermocompression) to produce an I-, T-, or S-shaped section in particular, as illustrated in FIG. 7.

Such parts could be produced using any known direct method such as thermosetting resin infusion or injection methods. The matrix used is of the thermosetting type. By way of example, the injected resin should be selected from the following thermosetting polymers: epoxies, unsaturated polyesters, vinyl esters, phenolics, polyimides, bismaleimides. The composite part is obtained after a heat treatment step. In particular, the composite part is generally obtained by a conventional cycle for consolidating the polymers under consideration, by carrying out a heat treatment, recommended by the suppliers of said polymers and known to the skilled person. This step of consolidating the desired part is carried out by polymerization/curing in accordance with a defined temperature cycle and under pressure, followed by cooling. The pressure applied during the treatment cycle is low for vacuum infusion and higher for injection into a RTM mold.

The intermediate material and the method of the invention can sometimes be used to produce composite parts with a FVF of the order of 60%, which corresponds to the standard fraction for primary aeronautical structures (i.e. vital parts of the equipment) and also to greatly improve the low-speed impact strength of the composite parts obtained: an example is dropping a tool in a workshop during manufacture of a composite structure, or an impact with a foreign body when in operational use.

The pressure applied during an injection method is higher than that used during an infusion method. This means that it is easier to produce parts with a correct FVF with an injection method than with an infusion method. The materials of the invention can be used to obtain the desired fiber volume fraction, in particular of the order of 53% to 60%, even when the composite part is produced with a step c) as mentioned above, which employs infusion and not injection of resin. Such an implementation still constitutes an advantageous variation.

The composite parts that may be obtained using the method of the invention also form an integral part of the invention, in particular parts that have a fiber volume fraction of 50% to 63%, especially 53% to 60%.

The examples below serve to illustrate the invention but are not limiting in nature.

Part A: Making Up Tapes

The T700GC-12K-31E carbon yarns were supplied by Toray Industries, Japan.

A 4-polyamide nonwoven (supplied with reference 128D04 by Protechnic, France), denoted veil "a", was used. The characteristics of veil "a" used for the manufacture of veiled tapes of the invention are indicated in Table 1. The melting point of the veil indicated in Table 1 was determined by differential scanning calorimetry (DSC) in accordance with ISO standard 11357-3. The weight per unit area was measured in accordance with ISO standard 3801. The degree of porosity indicated in Table 1 was calculated from the following formula:

$$Porosity_{web}(\%) = 1 - \frac{\text{weight per unit area of web}}{\rho_{web\ material} \times e_{web}} \times 100 \quad (2)$$

where:
the weight per unit area of veil is in $kg/m^2$ [kilogram per square meter];
$\rho_{veil\ material}$ is expressed in $kg/m^3$ [kilogram per cubic meter];
$e_{veil}$ is expressed in m [meter].

TABLE 1

Characteristics of veil used (the values shown after the ± represent the standard deviation)

| Reference | Veil "a" |
|---|---|
| Melting point of veil (° C.) | 178 |
| Weight per unit area (g/m²) | 4 ± 0.1 |
| Diameter of filaments (μm) * | 13 ± 3 |
| Thickness of veil (μm) | 69 ± 12 |
| Porosity (%) calculated from formula (2) | 97 |

* measured by image analysis.

Figure 8:
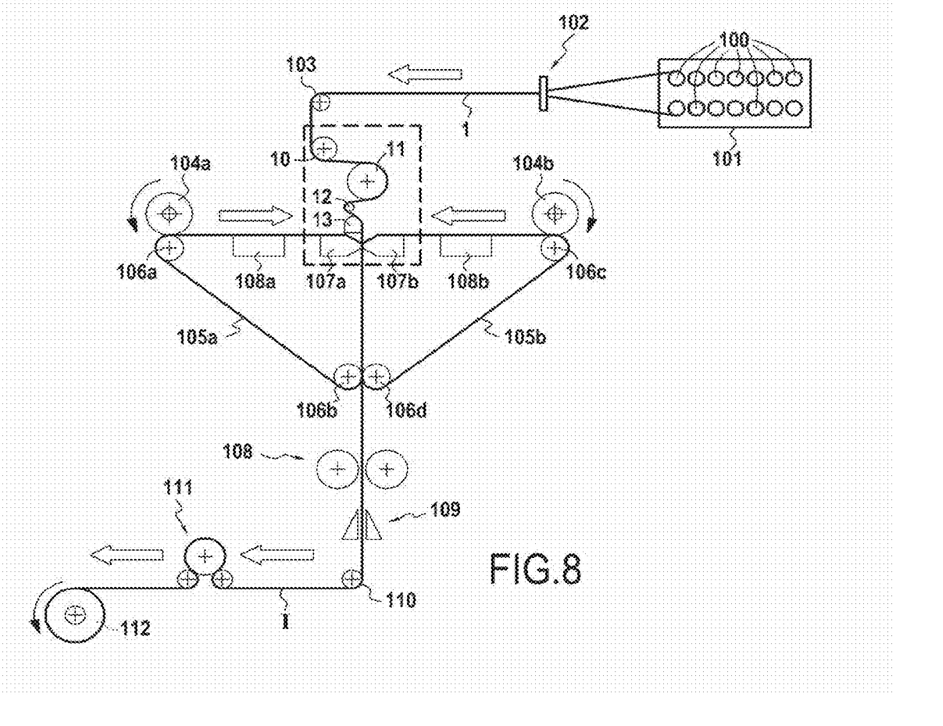
FIG. 8 is a diagrammatic representation of the whole of a device for producing a tape associated with a nonwoven on each of its major faces.

The carbon yarns were used to make up tapes in association with two veils a, using a machine such as that shown in FIG. 8. The reference to the heated cutting elements is: Thermocut TC-1 from LOEPFE BROTHER LIMITED, Wetzikon, Switzerland.

The carbon yarn or yarns 1 were unwound from carbon spools 100 fixed on a creel 101, passing through a comb 102, and were guided into the axis of the machine by means of a guide roller 103. The initial width of the 12K, 800 Tex carbon yarns varied from approximately 4.5 mm to 7 mm and were spread using a heated rod 11 and a spreading rod 12 then calibrated to a width of 5.42 mm using calibration means to provide a unidirectional sheet of the desired width. The rolls of nonwovens 104a and 104b were unwound without tension and transported using conveyor belts 105a and 105b fixed between the freely rotatable rollers 106a, 106b, 106c, 106d and the heated rods 107a, 107b. The nonwovens 2a and 2b were pre-heated in the zones 108a and 108b before coming into contact with the carbon yarns 1 and laminated either side of two heated rods 107a and 107b with a controlled gap. A calendar 108, which could be cooled, then applied a pressure to the unidirectional sheet with a nonwoven on each side, which was then directed towards the cutting means 109. A return roller 110 redirected the tape I towards the traction system comprising draw rollers 111 then wound 112 to form a roll made up of veiled tape I. The operating conditions are indicated in Table 2.

TABLE 2

| Nonwoven | Fiber | Weight per unit area of carbon (g/m²) | Width (mm) | Linear velocity (m/min) | T° Rod 11 (° C.) | T° Rod 13 (° C.) | T° 108a & 108b (° C.) | T° 107a & 107b (° C.) |
|---|---|---|---|---|---|---|---|---|
| veil "a" | T700 GC | 147 | 5.42 | 1.3 | 220 | 220 | 140 | 140 |

The characteristics of the tapes obtained are presented in Table 3.

The measurements of the mean and standard deviations were carried out using the following device: the veiled tape was unwound from its support at a constant rate of 1.2 m per minute, with a constant tension in the range 200 cN [centinewtons] to 400 cN, where it then passed, at a distance of 265 mm and without support in this region, in front of a Baumer Optronic model FWX 20 type camera, focal length 20 mm, 1624×1236 pixels (Baumer Optronic GmbH, Germany). The calibration of the camera was as follows: 1 pixel was equivalent to 0.05 mm, corresponding to a photograph size of 1640 pixels×0.05=82 mm. One photograph was then taken every 38 mm over a minimum length of 50 m, corresponding to a minimum of 1315 width measurements.

NEUROCHECK 5.1 software (Neurocheck GmbH, Germany) then analyzed the image and stored the width values in a file that then was treated statistically using MINITAB software (Minitab Inc, USA).

TABLE 3

| | | Mean width (mm) | Standard deviation (mm) |
|---|---|---|---|
| T700GC 12K | 147 g/m² | 5.42 | 0.13 |

Part B: Making Up Intermediate Materials

Figure 9:
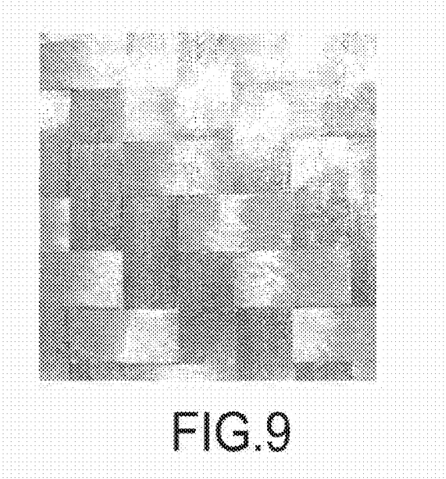
FIG. 9 illustrates a woven construction known as a 2/2 twill weave, used in the examples.

In all of the examples below, a 2/2 twill weave as shown in FIG. 9 was used to produce the intermediate materials of the invention, with the aid of the tapes as described above. 1.85 tapes (which corresponded to the number of yarns given that one tape was here composed of a single yarn) per cm [centimeter] were used in the warp and weft. This same weave was used in the comparative examples.

EXAMPLE 1

The tapes obtained with the veil "a" and calibrated to 5.42 mm were used in the warp and weft. The weave was produced on a Dornier loom (Lindau, Germany), Model PTS using the method known as "tangential run-out weaving" in patent EP 0 670 921, i.e. without post-weave spreading, at a rate of 100 picks/min. The weave was a 2/2 twill, the fiber count was 1.85 yarns/cm, in order to obtain a non-twisting fabric with a weight per unit area of 295 g/m².

COMPARATIVE EXAMPLE 1

T700GC-12K-31E non-veiled carbon yarns were used in the warp and weft. Weaving was carried out on a Dornier loom (Lindau, Germany), Model PTS, using the method known as "tangential run-out weaving" in patent EP 0 670 921, i.e. without post-weave spreading, at a rate of 100 picks/min. The weave was a 2/2 twill, the fiber count was 1.85 yarns/cm, in order to obtain a non-twisting fabric with a weight per unit area of 295 g/m² (reference 48302 from Hexcel Reinforcements).

COMPARATIVE EXAMPLE 2

T700GC-12K-31E non-veiled carbon yarns were used in the warp and weft. Weaving was carried out on a Dornier loom (Lindau, Germany), Model PTS using the method known as "tangential run-out weaving" in patent EP 0 670 921, i.e. without post-weave spreading, at a rate of 100 picks/min. The weave was a 2/2 twill, the fiber count was 1.85 yarns/cm, in order to obtain a non-twisting fabric with a weight per unit area of 295 g/m² (reference 48302 from Hexcel Reinforcements).

After weaving, each face of the fabric obtained was associated with a veil "a" as described above under the conditions given in Tables 4 and 5. A flat laminating line from S-Line (Brugg, Switzerland) was employed using the following parameters:

TABLE 4

| Linear velocity (m/min) | 3 |
|---|---|
| Residence time (s) | 44 |
| Gap (mm) | 0.3 |
| Gap due to overpressure (mm) | 0 |
| Calendar pressure (N/cm²) | 36 |

TABLE 5

| | Low zone | | | High zone | | |
|---|---|---|---|---|---|---|
| T (° C.) | Left | Center | Right | Left | Center | Right |
| Zone 1 | 135 | 163 | 135 | 135 | 163 | 135 |
| Zone 2 | 178 | 178 | 145 | 150 | 178 | 145 |
| Zone 3 | 190 | 190 | 190 | 190 | 190 | 190 |

Permeability Measurements

Figure 10:
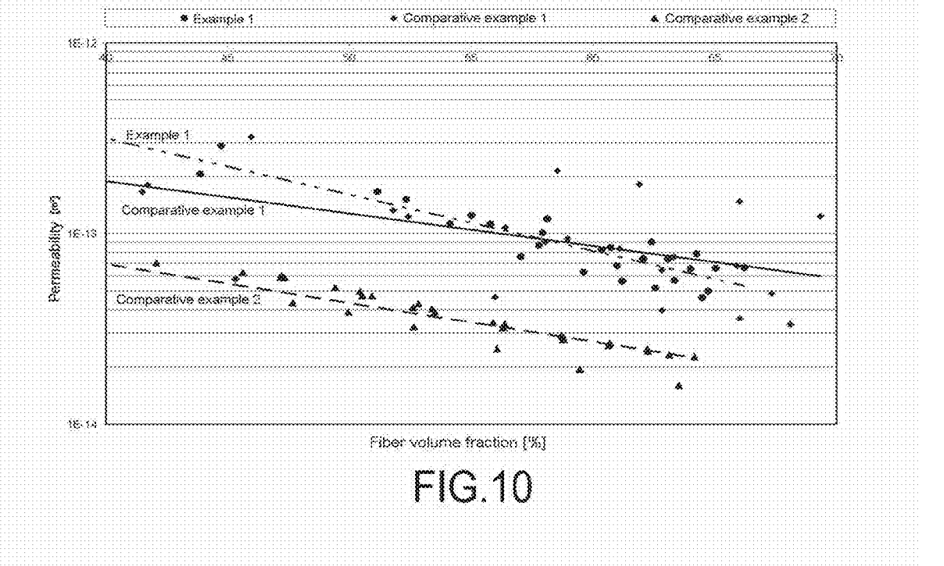
FIG. 10 shows the permeabilities as a function of the fiber volume fractions for an intermediate material of the invention.

The transverse permeability can be defined as the ability of a fluid to pass through a fibrous material. It is measured in m². The values given above and those mentioned in the following examples were measured using the apparatus and the measurement technique described in the thesis entitled "Problems concerning the measurement of transverse permeability of fibrous preforms for producing composite structures" by Romain Nunez at the Ecole Nationale Supérieure des Mines, Saint Etienne, Oct. 16, 2009, to which reference should be made for further details. In particular, the measurement is carried out by inspecting the thickness of the sample during the test using two co-cylindrical chambers that can be used to reduce the influence of race-tracking (fluid passing to the side or by-passing the material the permeability of which is to be measured). The fluid used is water and the pressure is 1 bar±0.01 bar. The permeability measurements obtained with the materials of Example 1 and the Comparative Examples 1 and 2 are shown in FIG. 10.

Measurement of Opening Factor

The opening factors were measured as follows.

The device was made up of a camera from SONY (model SSC-DC58AP) equipped with a 10× lens, and a light table from Waldmann, model W LP3 NR,101381 230V 50 Hz 2×15 W. The sample to be measured was placed on the light table, the camera was fixed on a stand and positioned 29 cm from the sample, then the sharpness was adjusted.

The measurement width was determined as a function of the fibrous material to be analyzed using the ring (zoom) and a ruler: 10 cm for the open fibrous materials (OF>2%), 1.17 cm for the less open fibrous materials (OF<2%)

Using the diaphragm and a reference image, the brightness was adjusted to obtain a value for the OF corresponding to that given on the reference image.

Videomet contrast measuring software from Scion Image (Scion Corporation, USA) was used. After capturing the image, it was processed as follows: using a tool, a maximum surface corresponding to the selected calibration was defined, for example for 10 cm—70 holes, comprising a whole number of motifs. Next, an elementary textile surface in the textile meaning of the term was selected, i.e. a surface that describes the geometry of the fibrous material by repetition.

Since light from the light table passes through the openings of the fibrous material, the OF as a percentage is defined as one hundred minus the black surface divided by the elementary surface, i.e. 100—(black surface/elementary surface).

It should be noted that adjusting the luminosity is important since diffusion phenomena could modify the apparent size of the holes and thus the OF. An intermediate luminosity was used so that no saturation phenomena or too much diffusion was visible.

The results obtained are shown in Table 6 below:

TABLE 6

| OF (%) | Mean | Standard deviation |
|---|---|---|
| Example 1 | 0.22 | 0.12 |
| Comparative Example 1 | 0.05 | 0.04 |
| Comparative Example 2 | 0.05 | 0.04 |

It should be noted that the values are very low for the three reinforcements described; fabrics with opening factors of less than 0.5% are termed "closed".

Part C: Production of Composite Parts

Composite plates were produced from an assembly of intermediate materials disposed in different orientations of 0°, 45°, −45°, 90°. The stack was symmetrical. The number of intermediate materials (also known as plies) making up the stack was determined using the following formula deduced from formula (3):

$$n_{plies} = \frac{TVF(\%) \times \rho_{carbon\ fiber} \times e_{plate}}{UD_{carbon}\ \text{weight per unit area}} \times 10 \quad (3)$$

knowing that:
the target thickness of the plate is as close as possible to 4 mm (defined in standard PrEN 6038), $e_{plate}$ is expressed in mm (in the examples the target thickness was 3.81 mm);
the target fiber volume fraction (FVF) to obtain the best mechanical properties was generally 60% and the $\rho_{carbon\ fiber}$ was expressed in g/cm³ [gram per cubic centimeter];
the weight per unit area of the $UD_{carbon}$ was expressed in g/m².

Thus, the stack was made up of 12 plies for a carbon weight per unit area of 295 g/m² and was given the abbreviated notation: $[(+45/−45)/(0/90)]_{3S}$.

4.2 Production of Composite Plate

The various plies were held together by light soldering each time a fresh ply was added, at a few points using a soldering iron. The assembly was made up of a preform. The preform of 340×340 mm made up of the stacked sequence adapted to the carbon weight per unit area was placed in an injection mold beneath a press. A frame of known thickness surrounded the preform in order to obtain the desired fiber volume fraction (FVF).

Epoxy resin supplied under the reference HexFlow RTM6 from Hexcel was injected at 80° C. and at a pressure of 2 bars through the preform, which was kept at 120° C. as the temperature of the plates and the press. The pressure applied to each of the two plates of the press was 5 bars. When the resin appeared at the outlet point of the mold, the outlet tube was closed and the polymerization cycle was started up (temperature rise to 180° C. at 3° C./min, then hold for 2 hours at 180° C., then cooling at 5° C./min). 6 specimens per type with a configuration of 150×100 mm (standard prEN 6038) were then cut out for the compression after impact test (CAI).

5. Mechanical Tests

The specimens (12 per type of configuration) were fixed on a device as indicated in standard prEN 6038. The specimens were impacted at different energies from 10 J [Joule] to 50 J using equipment adapted to the preliminary European standard, prEN, 6038 published by ASD-STAN (Aerospace and Defence Standard, Avenue de Tervueren 270, 1150 Woluwe-Saint-Pierre, Belgium). The compression tests were carried out on a Zwick mechanical test machine (Zwick France Sarl, Roissy Charles de Gaulle, France).

Figure 11:
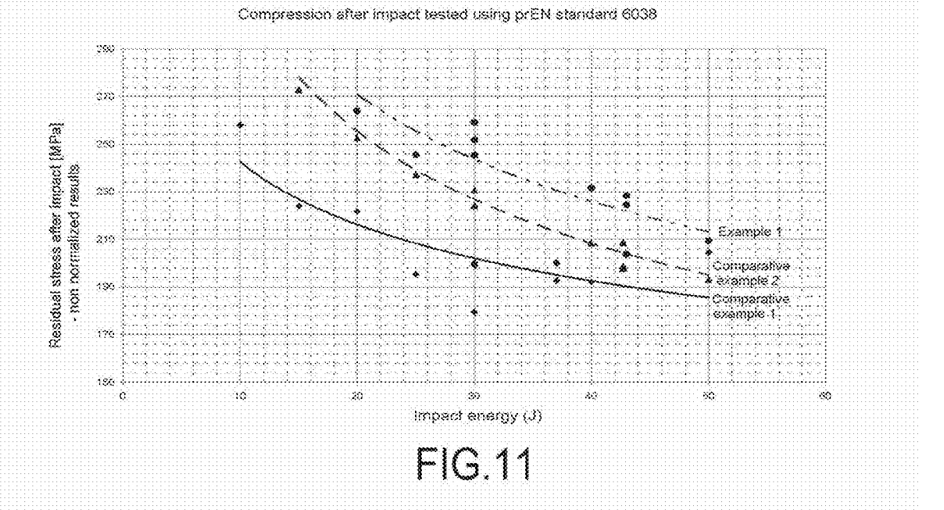
FIGS. 11 to 15 show the mechanical performances of composite parts obtained with an intermediate material of the invention.

The results of the compression after impact (CAI) breaking stress of the plate obtained with the intermediate materials of Example 1 and plates obtained with the intermediate materials of comparative Examples 1 and 2 are shown in FIG. 11. The CAI performances were improved for the composite parts of the invention.

Figure 12:
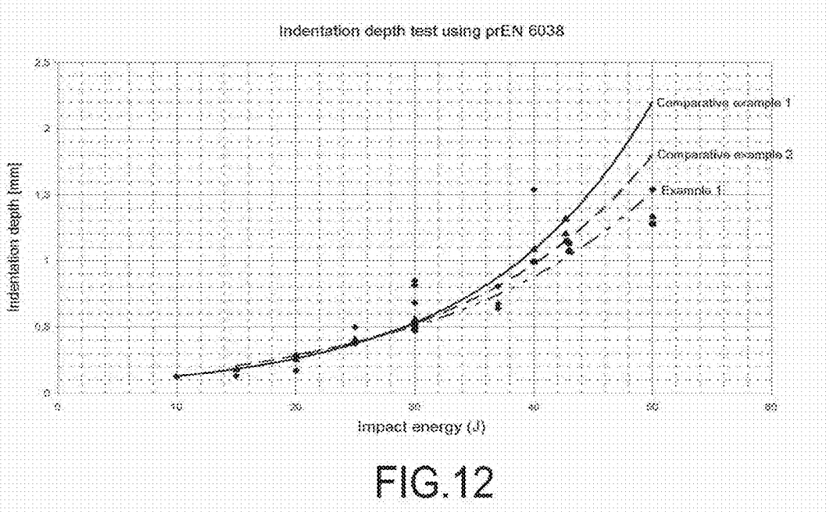
Figure 13:
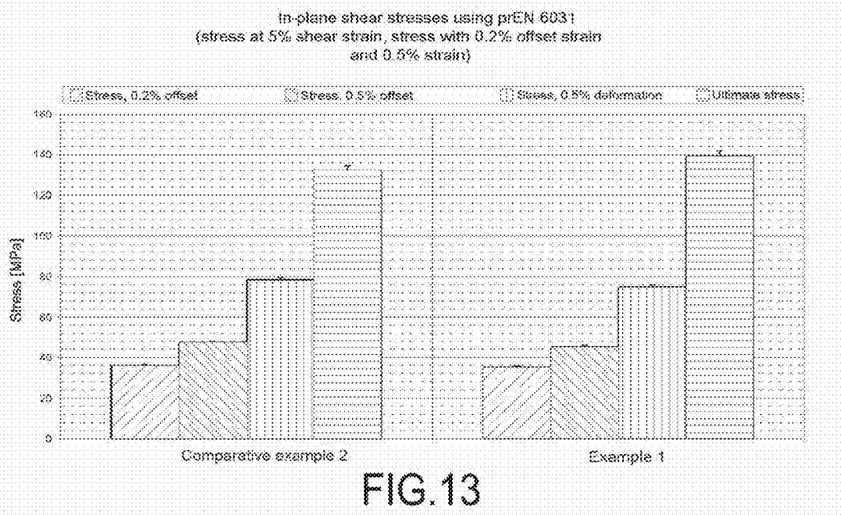
Figure 14:
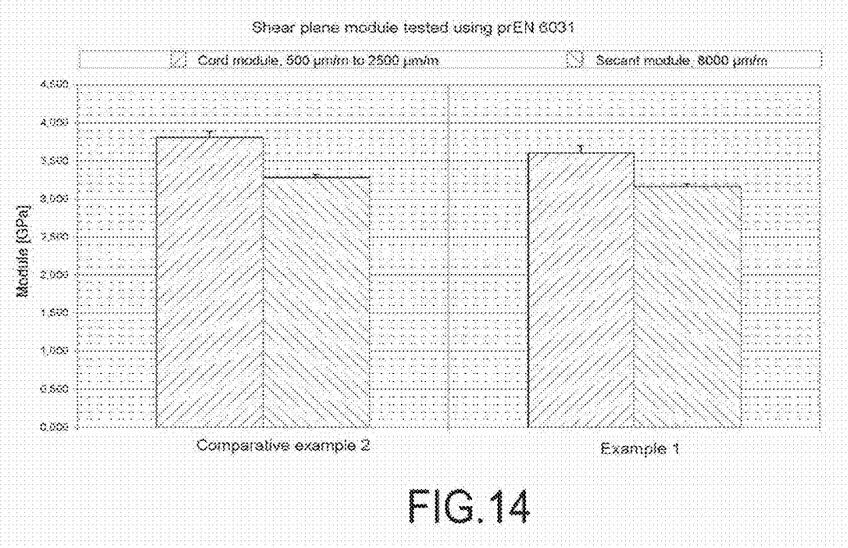
Figure 15:
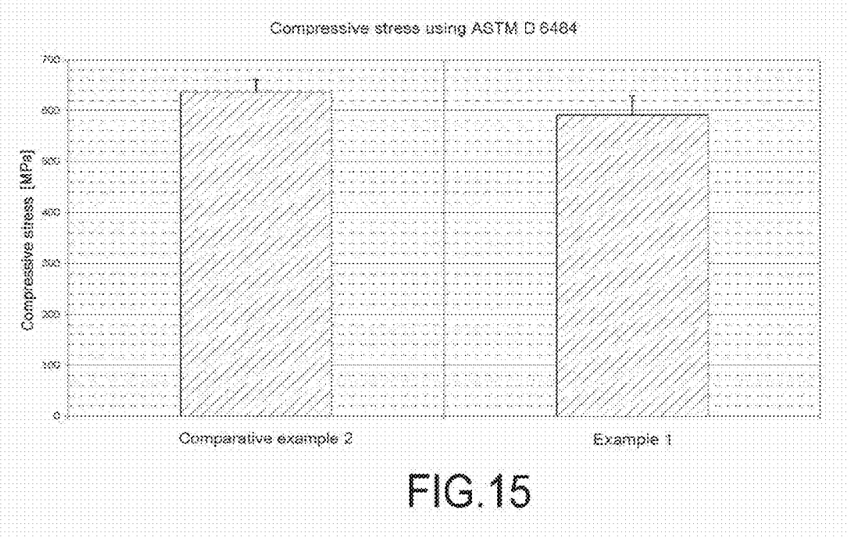

The results of the tests in accordance with standard prEN 6038 are given in FIG. 12. FIGS. 13, 14 and 15 compare the results of the compression after impact breaking stress of the plate obtained with the intermediate materials of Example 1 and of the plate obtained with the intermediate materials of Comparative Example 2, respectively using the tests of standard prEN 6031 (FIGS. 13 and 14) and the test of ASTM standard D 6484 (FIG. 15). In these tests, the mechanical performances were equivalent.

The invention claimed is:

1. A preform for use in forming composite parts by impregnating a resin into said preform, said preform being made from an intermediate material, said intermediate material comprising:
   an assembly of overlapping and interlaced veiled tapes which form a braided cylinder that is free of resin, said braided cylinder having an interior wall and an exterior wall wherein said interior wall defines an elongated cavity having a cross-sectional area and a cross-sectional shape, said assembly comprising:
   a first veiled tape and a second veiled tape, said first and second veiled tapes each having an interior side and an exterior side and wherein said first veiled tape and said second veiled tape each comprise:
      a) a plurality of reinforcing yarns that extend in a direction parallel to the length of said first or second veiled tape to form a first or second unidirectional sheet that has a first face located adjacent to the interior side of said first or second veiled tape and a second face located adjacent to the exterior side of said first or second veiled tape;
      b) a first nonwoven veil that comprises thermoplastic fibers, said first nonwoven veil comprising an inner side that is thermally bonded to the first face of said first or second unidirectional sheet, said first nonwoven veil comprising an outer side that forms the interior side of said first or second veiled tape; and
      c) a second nonwoven veil that comprises thermoplastic fibers, said second nonwoven veil comprising an inner side that is thermally bonded to the second face of said first or second unidirectional sheet, said second nonwoven veil comprising an outer side that forms the exterior side of said first or second veiled tape, said first veiled tape and said second veiled tape being overlapped and interlaced, after each of said first and second veiled tapes has had its respective nonwoven veils thermally bonded to each of the respective inner and outer sides of said first and second unidirectional sheets, to form said braided cylinder that is free of resin, whereby at the portions of said first and second veiled tapes where said tapes have been overlapped and interlaced, two layers of said nonwoven veil will be in direct contact with each other, and wherein said preform is made by deforming said braided cylinder that is free of resin so that said elongated cavity is collapsed to form said preform which has a collapsed elongated cavity that has a cross-sectional area which is less than the cross-sectional area of said elongated cavity and wherein the cross-sectional shape of said collapsed elongated cavity is not the same as the cross-sectional shape of said elongated cavity.

2. An intermediate material according to claim 1, wherein said first veiled tape or said second veiled tape has a substantially constant width over its entire length.

3. An intermediate material according to claim 1 wherein said first veiled tape or said second veiled tape veiled tape has longitudinal edges along which there are no cut fibers.

4. An intermediate material according to claim 1 wherein the weight of the nonwoven veils in said first veiled tape or said second veiled tape represents 3% to 10% of the total weight of said first veiled tape or said second veiled tape.

5. An intermediate material according to claim 1 wherein the reinforcing yarns in said first veiled tape or said second veiled tape are formed from a material selected from the following materials: carbon, glass, aramid, silica, basalt, ceramic, and mixtures thereof.

6. An intemediate material according to claim 5 wherein said first unidirectional sheet or said second unidirectional sheet consists of carbon fibers.

7. An intermediate material according to claim 1 wherein said first unidirectional sheet or said second unidirectional sheet comprises a unidirectional sheet of carbon yarn with a weight per unit area of 100 $g/m^2$ to 280 $g/m^2$ and wherein each of said first nonwoven veil and said second nonwoven veil each have a thickness of 0.5 micrometers to 50 micrometers.

8. An intermediate material according to claim 7, wherein said first veiled tape or said second veiled tape has a thickness of 80 micrometers to 380 micrometers.

9. An intermediate material according to claim 8, wherein the variability in the thickness of said first veiled tape or said second veiled tape does not exceed a standard deviation of 20 µm.

10. An intermediate material according to claim 1 wherein said first woven veil and said second woven veil each have a weight per unit area in the range from 0.2 $g/m^2$ to 20 $g/m^2$.

11. A preform according to claim 1 wherein said elongated cavity is collapsed a sufficient amount so that the cross-sectional area of said collapsed elongated cavity is substantially eliminated.

12. A preform according to claim 1 wherein the collapsed elongated cavity of said preform has a cross-sectional shape selected from the group consisting, of I-shapes T-shapes and S-shapes.

13. A resin impregnated preform comprising a preform according to claim 12 which has been impregnated with a curable resin.

14. A molded part comprising a resin impregnated preform according to claim 13 wherein said curable resin has been cured.

15. A preform according to claim 1 wherein the collapsed elongated cavity of said preform is formed by using thermocompression to deform said braided cylinder that is free of resin.

16. A resin impregnated preform comprising a preform according to claim 1 which has been impregnated with a curable resin.

17. A molded part comprising a resin impregnated preform according to claim 16 wherein said curable resin has been cured.

\* \* \* \* \*